United States Patent
Brown et al.

(10) Patent No.: US 7,945,576 B2
(45) Date of Patent: May 17, 2011

(54) LOCATION RECOGNITION USING INFORMATIVE FEATURE VOCABULARY TREES

(75) Inventors: Matthew Brown, Seattle, WA (US); Grant Schindler, Atlanta, GA (US)

(73) Assignee: Microsoft Corporation, Redmond, WA (US)

( * ) Notice: Subject to any disclaimer, the term of this patent is extended or adjusted under 35 U.S.C. 154(b) by 777 days.

(21) Appl. No.: 11/754,671

(22) Filed: May 29, 2007

(65) Prior Publication Data

US 2008/0301133 A1 Dec. 4, 2008

(51) Int. Cl.
*G06F 17/30* (2006.01)
(52) U.S. Cl. .................................................. 707/769
(58) Field of Classification Search .................. 707/609, 707/705, 736, 763, 769, 781, 802
See application file for complete search history.

(56) References Cited

U.S. PATENT DOCUMENTS

| | | | |
|---|---|---|---|
| 6,430,312 B1 | 8/2002 | Huang et al. | |
| 6,760,714 B1 | 7/2004 | Caid et al. | |
| 6,813,395 B1 | 11/2004 | Kinjo | |
| 7,051,019 B1 | 5/2006 | Lund et al. | |
| 7,099,860 B1 | 8/2006 | Liu et al. | |
| 7,113,944 B2 | 9/2006 | Zhang et al. | |
| 2003/0195883 A1 | 10/2003 | Mojsilovic et al. | |
| 2005/0002562 A1 | 1/2005 | Nakajima et al. | |
| 2005/0271304 A1 | 12/2005 | Retterath et al. | |
| 2006/0133699 A1 | 6/2006 | Widrow et al. | |
| 2007/0143009 A1* | 6/2007 | Nomura et al. | 701/208 |
| 2007/0214172 A1* | 9/2007 | Nister et al. | 707/102 |

OTHER PUBLICATIONS

Lin et al., Robust Invariant Features for Object Recognition and Mobile Robot Navigation, 2005, IAPR Conference, pp. 1-4.*
Li et al., Probabilistic Location Recognition using Reduced Feature Set, 2006, IEEE, pp. 1-6.*
Szeliski et al., City-Scale Location Recognition, 2007, IEEE, pp. 1-7.*
Beis, J., and D. G. Lowe, Shape indexing using approximate nearest-neighbour search in high-dimensional spaces, Conf. on Comp. Vision and Pattern Recognition, Puerto Rico (1997), pp. 1000-1006.
Brin, S., Near-neighbor search in large metric spaces, Proceedings of the Int'l Conf. on Very Large Databases (VLDB), 1995, pp. 574-584, Zurich, Switzerland.
Cox, I. J., M. L. Miller, T. P. Minka, T. Papathomas and P. N. Yianilos, The Bayesian image retrieval system, PicHunter: Theory, implementation and psychophysical experiments, IEEE Transactions on Image Processing, Jan. 2000, pp. 20-37, vol. 9, No. 1.

(Continued)

*Primary Examiner* — Fred I Ehichioya
(74) *Attorney, Agent, or Firm* — Lyon & Harr, LLP; Richard T. Lyon

(57) ABSTRACT

A location recognition technique that involves using a query image to identify a depicted location is presented. In addition to the query image, there is also a pre-constructed database of features which are associated with images of known locations. The technique matches features derived from the query image to the database features using a specialized vocabulary tree, which is referred to as an informative feature vocabulary tree. The informative feature vocabulary tree is specialized because it was generated using just those database features that have been deemed informative of known locations. The aforementioned matching features are used to identify a known location image that matches the query image. The location associated with that known location image is then deemed to be the location depicted in the query image.

17 Claims, 9 Drawing Sheets

OTHER PUBLICATIONS

Fukunaga, K., and P. M. Narendra, A branch and bound algorithm for computing k-nearest neighbors, IEEE Transactions on Computers, Jul. 1975, pp. 750-753, vol. 24, No. 7.

Gonzalez, T. F., Clustering to minimize the maximum intercluster distance, J. of Theoretical Comp. Science, Jun. 1985, pp. 293-306, vol. 38, No. 2-3.

Hare, J. S., and P. H Lewis, Saliency-based models of image content and their application to auto-annotation by semantic propagation, Proceedings of Multimedia and the Semantic Web / European Semantic Web Conf., 2005.

Li, F., and J. Kosecka, Probabilistic location recognition using reduced feature set, IEEE Int'l Conf. on Robotics and Automation, May 15-19, 2006, pp. 3405-3410.

Lowe, D. G., Object recognition from local scale-invariant features, Proc. of the Int'l Conf. on Comp. Vision, ICCV, 1999, pp. 1150-1157.

Mojsilovic, A., J. Kovacevic, J. Hu, R. J. Safranek, K. Ganapathy, Matching and retrieval based on the vocabulary and grammar of color patterns, IEEE Trans. on Image Processing, Jan. 2000, pp. 38-54, vol. 9, No. 1.

Moore, A. W., The anchors hierarchy: Using the triangle inequality to survive high dimensional data, Proc. of the 16th Conf. on Uncertainty in Artificial Intelliegence, 2000, pp. 397-405.

Nistér, D., and H. Stewénius, Scalable recognition with a vocabulary tree, IEEE Conf. on Comp. Vision and Pattern Recognition, (CVPR), Jun. 2006, pp. 2161-2168, vol. 2.

Robertson, D. and Cipolla, R., An image-based system for urban navigation, Proc. of the 15th British Machine Vision Conf. (BMVC'04), 2004, pp. 819-828, Digital Imaging Research Centre, Kingston University, Kingston-upon-Thames, Surrey.

Shao, H., T. Svoboda, T. Tuytelaars and L. Van Gool, HPAT indexing for fast object/scene recognition based on local appearance, Computer Lecture Notes on Image and Video Retrieval, Jul. 2003, pp. 71-80.

Vasconcelos, N. Lippman, A., Statistical models of video structure for content analysis andcharacterization, IEEE Transactions on Image Processing, Jan. 2000, pp. 3-19, vol. 9, No. 1.

Vidal-Naquet, M., and S. Ullman, Object recognition with informative features and linear classification, Proc. of the Ninth IEEE Int'l Conf. on Computer Vision, 2003, pp. 281-288, vol. 2.

Zhang, W., and J. Kosecka, Image based localization in urban environments, Proc. of the Third Int'l Symposium on 3D Data Processing, Visualization, and Transmission (3DPVT'06), 2006, pp. 33-40.

Sivic, J., and A. Zisserman, Video Google: A text retrieval approach to object matching in videos, Ninth IEEE Intl Conf. on Computer Vision, (ICCV'03), Oct. 2003, pp. 1470-1477, vol. 2, IEEE Computer Society.

* cited by examiner

LOCATION RECOGNITION USING INFORMATIVE FEATURE VOCABULARY TREES

BACKGROUND

The existence of large-scale image databases of the world opens up the possibility of recognizing one's location by simply taking a photo of the nearest street corner or storefront and finding the most similar image in a database.

However, when this database consists of millions of images of the world, the problem of efficiently searching for a matching image becomes difficult. The standard approach to image matching is to convert each image to a set of scale and rotation invariant feature descriptors (which are often simply referred to as features). In large databases this approach runs into storage space and search time problems as there could be tens of millions of features to deal with.

SUMMARY

It is noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

The present location recognition technique involves using an image to identify a depicted location. This image is referred to as a query image. In addition to the query image, there is also a pre-constructed database of features, which are derived from images of known locations. The present technique matches features derived from the query image to the database features using a specialized vocabulary tree, which is referred to as an informative feature vocabulary tree. The informative feature vocabulary tree is specialized because it was generated using just those database features that have been deemed informative of known locations. The use of an informative feature vocabulary tree helps alleviate storage space and search time problems when the database is large. The aforementioned matching features are used to identify a known location image that matches the query image. The location associated with that known location image is then deemed to be the location depicted in the query image.

Generally, the foregoing is accomplished by first generating an informative feature vocabulary tree. Each database feature associated with each known location image is then input into the informative feature vocabulary tree, in turn, and at least one visual word is output by the tree for each database feature. Each visual word output from the tree is assigned to the known location image associated with the database feature producing it. Thus, each known location image has a number of visual words assigned to it at the end of the first part of the present technique. This part of the technique need only be done once, and can be used to identify the location depicted in any query image if the location is depicted in the known location images used to construct the database.

The second part of the present technique involves first generating query image features representative of the query image. This can be done using the same method as was used to generate the database features from the known location images. Each query feature is then input, in turn, into the informative feature vocabulary tree, and the visual word or words output as a result are noted. It is then determined which known location image has the most visual words in common with the query image, and the location associated with that known location image is designated as the location depicted in the query image.

It is noted that while the foregoing limitations in existing image database-centric location recognition schemes described in the Background section can be resolved by a particular implementation of a location recognition technique according to the present invention, this is in no way limited to implementations that just solve any or all of the noted disadvantages. Rather, the present technique has a much wider application as will become evident from the descriptions to follow.

DESCRIPTION OF THE DRAWINGS

The specific features, aspects, and advantages of the present invention will become better understood with regard to the following description, appended claims, and accompanying drawings where:

DETAILED DESCRIPTION

In the following description of embodiments of the present invention reference is made to the accompanying drawings which form a part hereof, and in which are shown, by way of illustration, specific embodiments in which the invention may be practiced. It is understood that other embodiments may be utilized and structural changes may be made without departing from the scope of the present invention.

1.0 The Computing Environment

Before providing a description of embodiments of the present location recognition technique, a brief, general description of a suitable computing environment in which portions thereof may be implemented will be described. The present technique is operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1:
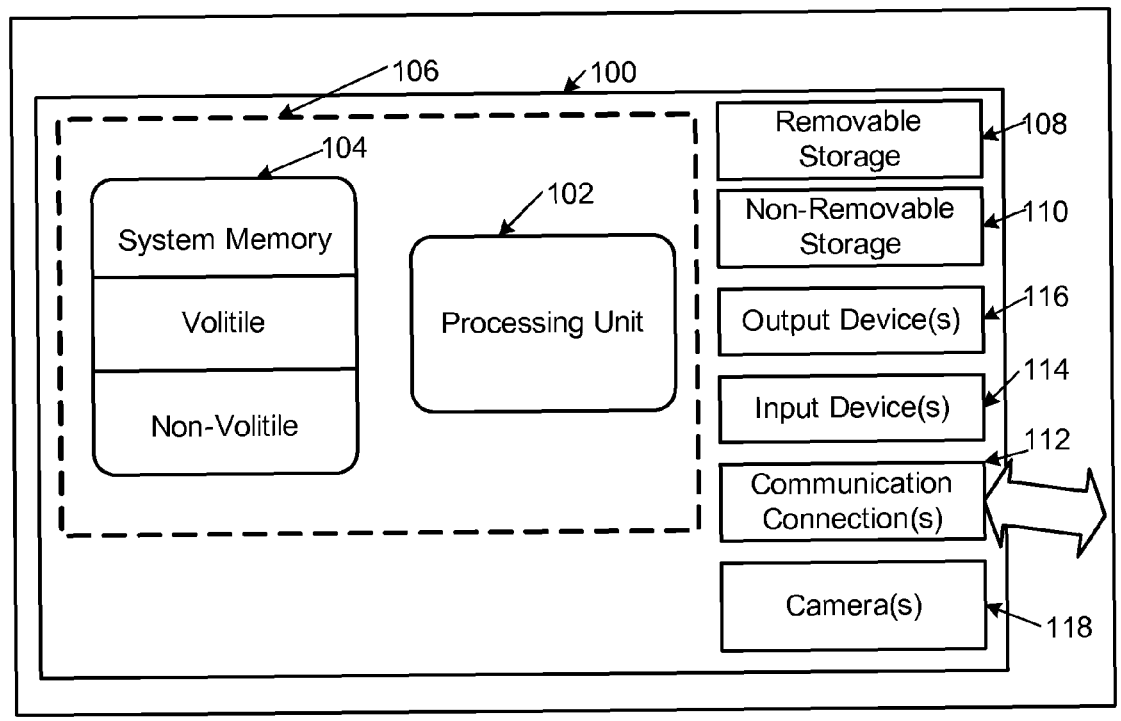
FIG. 1 is a diagram depicting a general purpose computing device constituting an exemplary system for implementing the present invention.

FIG. 1 illustrates an example of a suitable computing system environment. The computing system environment is only one example of a suitable computing environment and is not intended to suggest any limitation as to the scope of use or functionality of the present location recognition technique. Neither should the computing environment be interpreted as having any dependency or requirement relating to any one or combination of components illustrated in the exemplary operating environment. With reference to FIG. 1, an exemplary system for implementing the present technique includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, mouse, pen, voice input device, touch input device, etc. Output device(s) 116 such as a display, speakers, printer, etc. may also be included. All these devices are well know in the art and need not be discussed at length here.

Of particular note is that device 100 can include a camera 118 (such as a digital/electronic still or video camera, or film/photographic scanner), which is capable of capturing a sequence of images, as an input device. Further, multiple cameras 118 could be included as input devices. The images from the one or more cameras are input into the device 100 via an appropriate interface (not shown). However, it is noted that image data can also be input into the device 100 from any computer-readable media as well, without requiring the use of a camera.

The present location recognition technique may be described in the general context of computer-executable instructions, such as program modules, being executed by a computing device. Generally, program modules include routines, programs, objects, components, data structures, etc. that perform particular tasks or implement particular abstract data types. The present technique may also be practiced in distributed computing environments where tasks are performed by remote processing devices that are linked through a communications network. In a distributed computing environment, program modules may be located in both local and remote computer storage media including memory storage devices.

The exemplary operating environment having now been discussed, the remaining parts of this description section will be devoted to a description of the program modules embodying the present location recognition technique.

2.0 The Location Recognition Technique

The present location recognition technique involves using an image of a location it is desired to identify. This is referred to as a query image. In addition to the query image, there is also a pre-constructed database of features, such as Scale Invariant Feature Transform (SIFT) feature descriptors, which are associated with images of known locations. The present technique matches features derived from the query image to the database features using a specialized vocabulary tree, which is referred to as an informative feature vocabulary tree. These matching features are then used to identify the known location image that matches the query image. The location associated with that known location image is then deemed to be the location depicted in the query image.

Figure 2A:
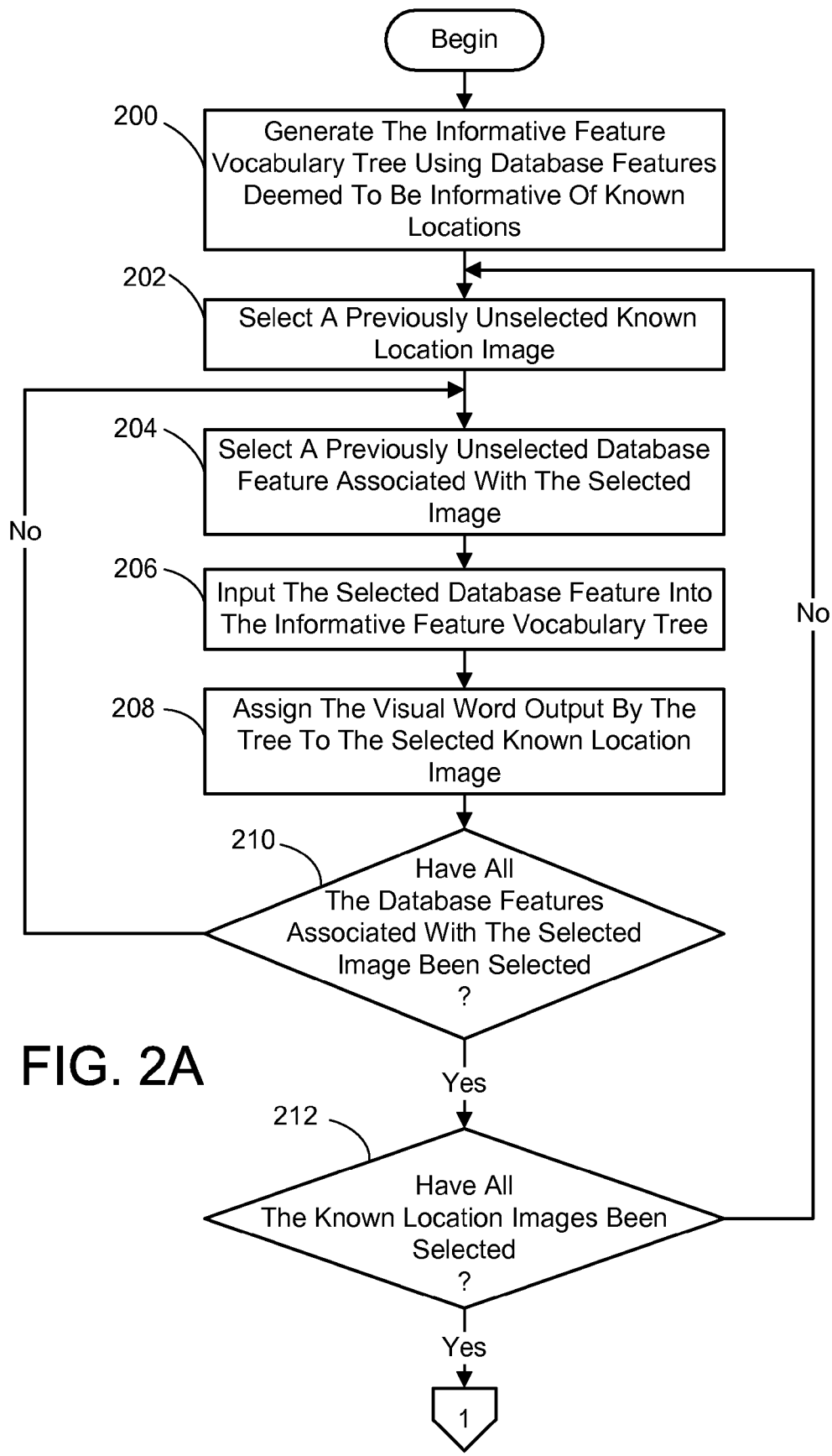
FIGS. 2A-B depict a continuing flow diagram generally outlining one embodiment of a process for recognizing a location depicted in a query image using an informative feature vocabulary tree according to the present invention.
Figure 2B:
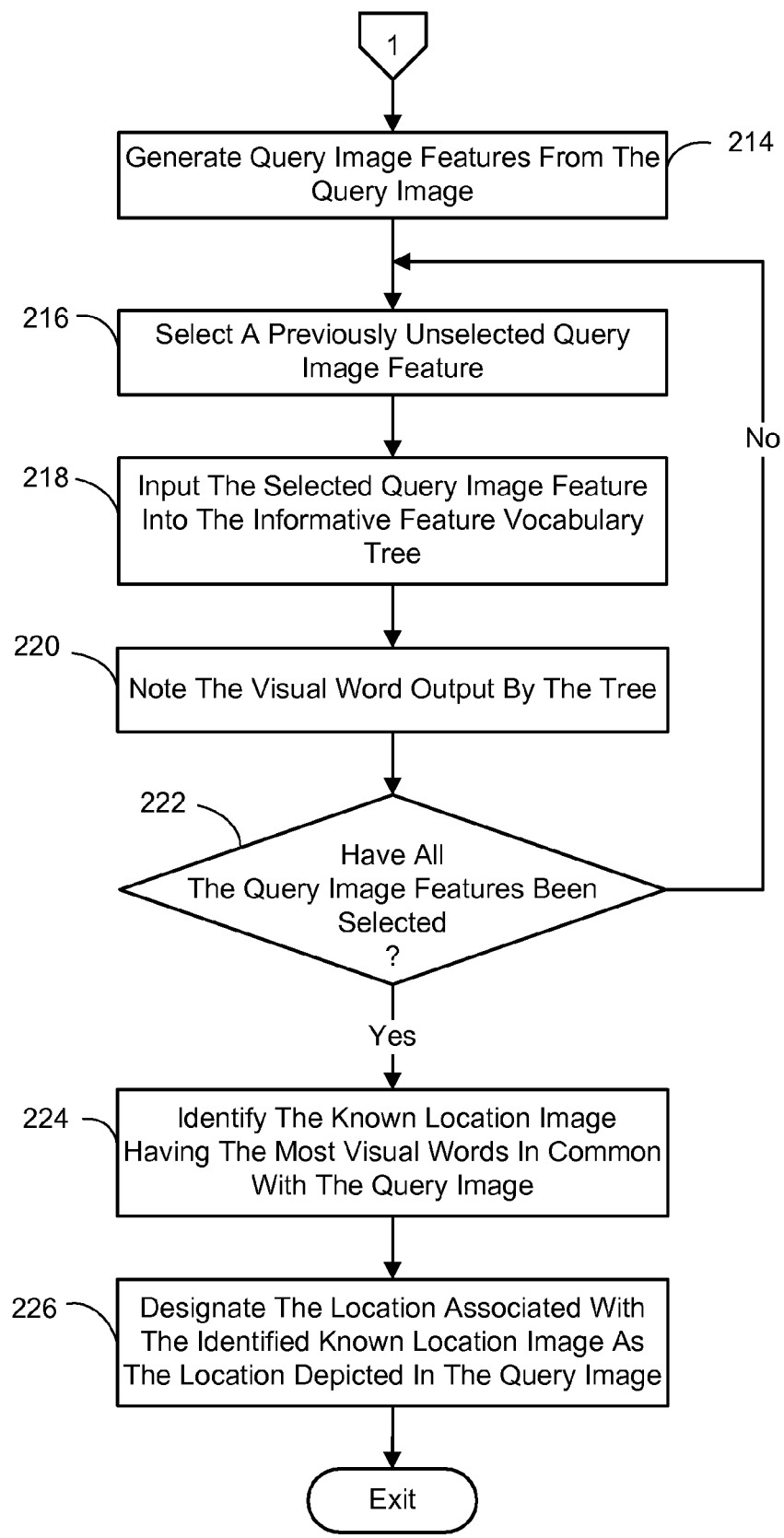

The location recognition technique is generally outlined in the flow diagram shown in FIGS. 2A-B, where first the aforementioned informative feature vocabulary tree is generated using just those database features that are deemed informative of the known locations (200). The informative feature vocabulary tree is then used to characterize the known location images in terms of visual words output by the tree. More particularly, a previously unselected known location image is selected (202), followed the selection of a previously unselected database feature associated with that image (204). The selected database feature is input into the informative feature vocabulary tree (206) and the visual word output by the tree is assigned to the selected known location image (208). It is then determined if all the database features associated with the selected known location image have been selected and processed (210). If not, actions 204 through 210 are repeated. If all the database features associated with the selected known location image have been selected and processed, then it is determined if all the known location images have been selected (212). If not, actions (202) through (212) are repeated as appropriate. Otherwise, the technique proceeds to a second part as described below. It is noted that this first part of the technique need only be done once, and can be used to identify the location depicted in any query image if the location is depicted in the known location images used to construct the database.

Referring now to FIG. 2B, query image features are generated from the query image using the same technique that was used to generate the database features from the known location images (214). For example, if the database features were generated using the SIFT method, the query image features would be generated using this method as well. A previously unselected query image feature is selected (216), and it is input into the informative feature vocabulary tree (218). The visual word output by the tree is noted (220), and it is then determined if all the query image features have been selected and processed (222). If not, actions 216 through 222 are repeated until all the query image features have been considered. The known location image having the most visual words in common with the query image is then identified (224). Finally, the location associated with the identified known location image is designated as the location depicted in the query image (226).

In the sections to follow, a general description of vocabulary trees as they apply to the present location recognition technique will be presented first. This will be followed by a description of the formation of informative feature vocabulary trees and a new search approach for the present technique.

2.1 Vocabulary Trees

The vocabulary tree is an effective data structure for searching a large database in high-dimensional spaces. As image databases increase in size, several barriers present themselves that prevent traditional feature matching techniques from scaling up. First, there may simply be too many feature descriptors to store in memory. For example, the feature descriptors derived from 30,000 images can number around 100 million (i.e., about 12 GB). In addition, there may be too many features to exhaustively compare against a query feature in any reasonable amount of time.

One way of dealing with these issues is the use of a vocabulary tree. A vocabulary tree is a k-way tree of depth D such that there are $k^D$ leaf nodes, or visual words, at the bottom of the tree. It is best understood as the product of a hierarchical k-means clustering of a number of descriptors, where each node in the tree is a feature descriptor equal to the mean of all the descriptors assigned to it. In one embodiment of the present technique, the vocabulary tree is constructed using a hierarchical k-means procedure, where the cluster centers are initialized with points that are as far apart from each other as possible. The tree is queried by comparing a query feature to all k nodes at the root level to find the closest match, and then recursively comparing it to all k children of that node. The database features corresponding to any visual word will all cluster around a single feature descriptor, and thus it is possible to throw away the descriptor for all features in the database and instead store a 6-byte pointer to each feature in the form of an image number (4-byte int) and feature number (2-byte short). This solves the aforementioned storage problem.

Note that the vocabulary tree is an instance of a metric tree in the sense it is a tree that organizes data in a metric space in which a metric distance between any two points can be computed. In querying a vocabulary tree, the important thing is the distance between a query feature and each node in the tree.

Vocabulary trees are adopted in the present location recognition technique to organize and search what can be millions of feature descriptors without explicitly storing the descriptors themselves. Using vocabulary trees in the context of location recognition allows a determination of which features are the most informative about a given location and to structure the tree based on these informative features.

2.2 Informative Features

Generic vocabulary trees are known to provide acceptable recognition performance when trained on data unrelated to the images eventually used to fill the database. This can be important when the database is expected to change on the fly. However, if the database consists of a fixed set of images, the aim should be to instead build a vocabulary tree that maximizes performance of queries on the database.

For example, given a fixed vocabulary of a prescribed number (e.g., 1 million) of visual words, not only can the branching factor and depth of the tree be varied, but also training data can be chosen such that the capacity of the tree is spent modeling the parts of feature space occupied by those features which are most informative about the locations of the database images. This becomes even more important when the database becomes so large that the hierarchical k-means process used to the build the vocabulary tree cannot cluster all the data at once, but must instead build a tree based on some subset of the database.

In selecting the subset of data for training, the database can either be uniformly sampled, or in accordance with the present technique, those features which are most informative can be chosen, as will now be described.

Figure 3A:
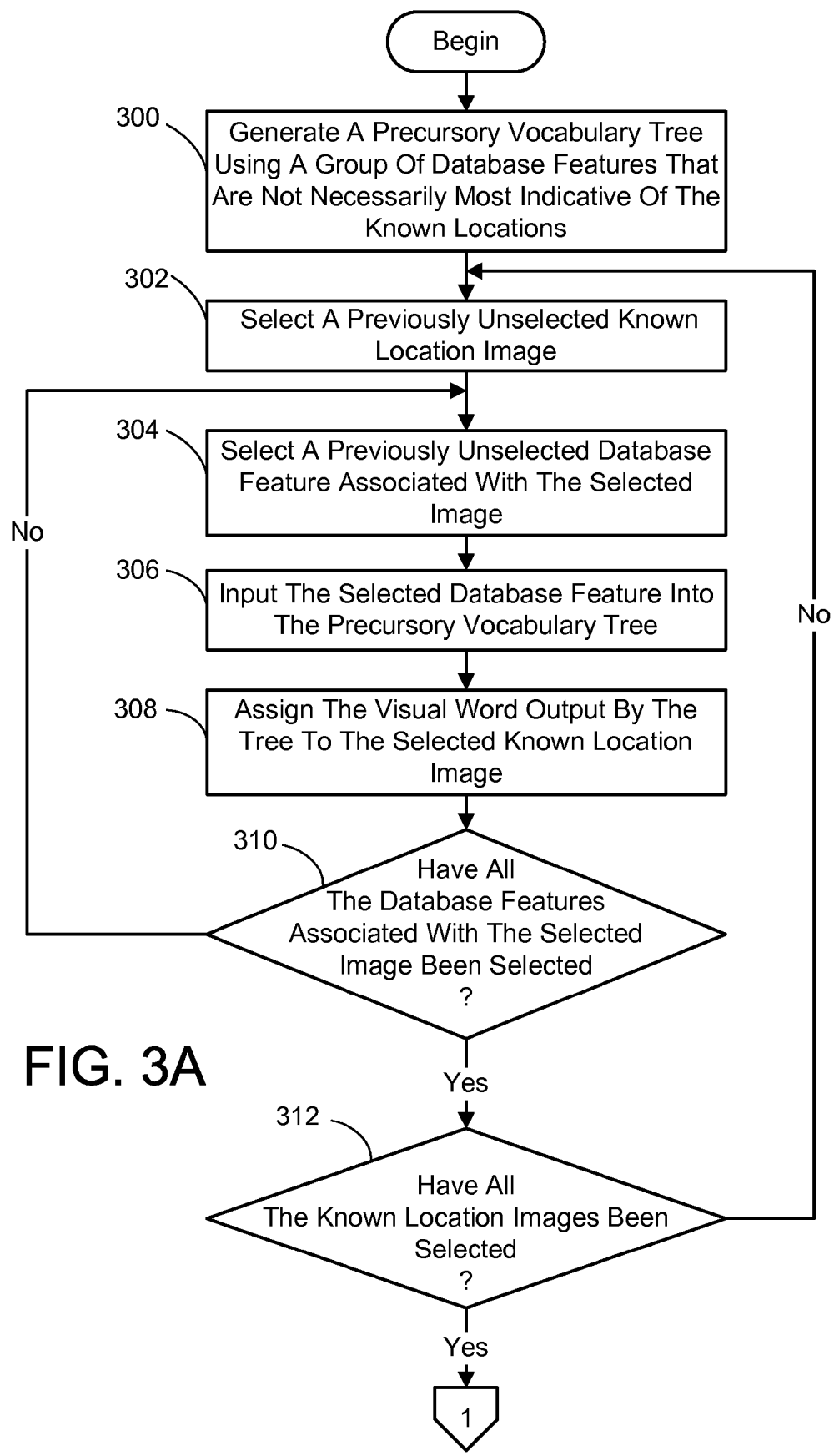
FIGS. 3A-B depict a continuing flow diagram generally outlining one embodiment of a process for generating an informative feature vocabulary tree using a database of features derived from images having a known location.

As mentioned previously, the foregoing informative feature vocabulary tree is generated using just those database features that have been deemed informative of locations depicted in the known location images. These known location images are made up of multiple images of each location of interest. Each image in the group of images depicting the same location was captured from a different viewpoint. This redundancy in the known location images is exploited in one embodiment of the present technique to identify database features that are informative of a location. More particularly, referring to FIGS. 3A-B, the informative feature vocabulary tree can be generated as follows. First, a precursory vocabulary tree is generated using a group of database features that are not necessarily most indicative of the known locations (300). As indicated previously this can be accomplished using a hierarchical k-means technique where the cluster centers are initialized so as to be as far apart from each other as possible. However, other conventional vocabulary tree generation methods could be used instead.

Once the precursory vocabulary tree has been generated, a previously unselected known location image is selected (302), followed by the selection of a previously unselected database feature associated with that image (304). The selected database feature is input into the precursory vocabulary tree (306) and the visual word output by the tree is assigned to the selected known location image (308). It is then determined if all the database features associated with the selected known location image have been selected and processed (310). If not, actions 304 through 310 are repeated. If all the database features associated with the selected known location image have been selected and processed, then it is determined if all the known location images have been selected (312). If not, actions 302 through 312 are repeated as appropriate. Otherwise, the technique proceeds as will be described below. It is noted that the result of the foregoing action is to assign groups of visual words to each known location image based on the database features associated with the image.

Figure 3B:
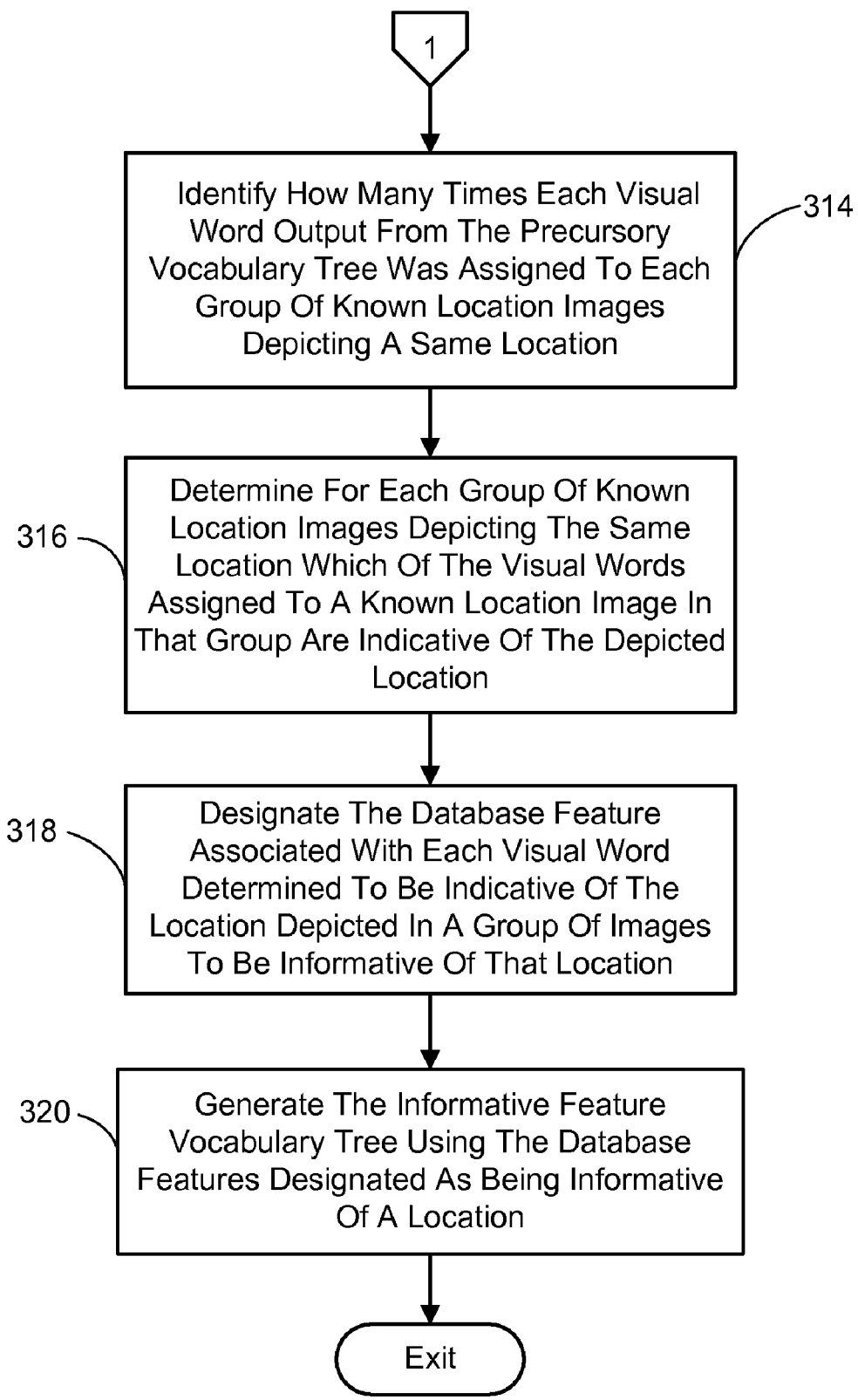

Referring now to FIG. 3B, the informative feature vocabulary tree generation technique continues with identifying how many times each visual word output from the precursory vocabulary tree was assigned to each group of known location images depicting a same location (314). It is then determined for each group of known location images depicting the same location which of the visual words assigned to a known location image in that group are indicative of the depicted location (316). In general, this is accomplished based on the number of times the visual word was assigned to an image in the group in view of the number of times the visual word was assigned to an image not in the group, and will be described in more detail later. The database feature associated with each visual word determined to be indicative of the location depicted in a group of images is designated to be informative of that location (318). The informative feature vocabulary tree is then generated using just the database features designated as being informative of a location (320). Here again this can be accomplished using a hierarchical k-means technique as described above or some alternate method as desired.

It is noted that the size of the aforementioned group of database features used to generate the precursory vocabulary tree can encompass all the features in the database. However, as mentioned previously, large numbers of features cannot be effectively clustered and so a vocabulary tree generated using all the features of a large database may not provide satisfactory results. Thus, when the database of features is known to be too large to effectively generate a single precursory vocabulary tree, multiple precursory trees can be constructed and processed as described above to establish the informative features associated with prescribed-sized portions of the known location images. The prescribed-sized portion of the known location images is chosen so that the database features derived from the images do not exceed a maximum threshold. For example, in tested embodiments, this threshold was set to about 8 million features as this is the number of SIFT features that can be comfortably hierarchically clustered. This processing of prescribed-sized portions of the known location images would be repeated until all the images have been considered. Then, the informative features established in all of the precursory trees would be used to generate a single informative feature vocabulary tree.

2.2.1 Information Gain

As mentioned previously, the database is made up of feature descriptors derived from a collection of images of locations where multiple images of each location have been included, just captured at different viewpoints. Thus, the images contain considerable overlap. Intuitively, it is desirable to find features in the database that occur in all images of some specific location, but rarely or never occur anywhere outside of that single location. This intuitive concept is captured well by the formal concept of information gain.

Information gain $I(X|Y)$ is a measure of how much uncertainty is removed from a distribution given some specific additional knowledge, and it is defined with respect to the entropy $H(X)$ and conditional entropy $H(X|Y)$ of distributions $P(X)$ and $P(X|Y)$. By definition:

$$H(X) = -\sum_{x} P(X=x)\log[P(X=x)] \quad (1)$$

$$H(X|Y) = \sum_{y} P(Y=y)H(X|Y=y) \quad (2)$$

$$I(X|Y) = H(X) - H(X|Y) \quad (3)$$

In the foregoing example, information gain $I(L_i|W_j)$ is always computed with respect to a specific location $l_i$ and a specific visual word $w_j$. $L_i$ is a binary variable that is true when at location $l_i$, and $W_j$ is a binary variable that is true when the visual word $w_j$ is in view (i.e., one of the images at location $l_i$ contains a feature which falls under visual word $w_j$ when quantized according to the vocabulary tree). It is desirable to know both the probability $P(L_i)$ that a query image is of a location $l_i$ in general, as well as the probability $P(L_i|W_j)$ that the query image is of a location $l_i$ given that the image exhibits a feature which falls under visual word $w_j$. If $N_{DB}$ is defined as the number of images used to generate the feature database and $N_L$ as the number of images of each location, then $$P(L_i) = \frac{N_L}{N_{DB}}$$

and by Eq. (1), the entropy of this distribution is $$H(L_i) = -P(L_i)\log[P(L_i)] - P(\overline{L}_i)\log[P(\overline{L}_i)] \quad (4)$$

The information gain of visual word $w_j$ at location $l_i$, as defined in Eq. (3), is:

$$I(L_i|W_j) = H(L_i) - H(L_i|W_j) \quad (5)$$

Remember that the goal is to find those visual words at location $l_i$ that maximize this information gain value. Since the entropy $H(L_i)$ is constant across all visual words at location $l_i$, then according to Eq. (5), a visual word that maximizes the information gain $I(L_i|W_j)$ also minimizes the conditional entropy $H(L_i|W_j)$.

Figure 4:
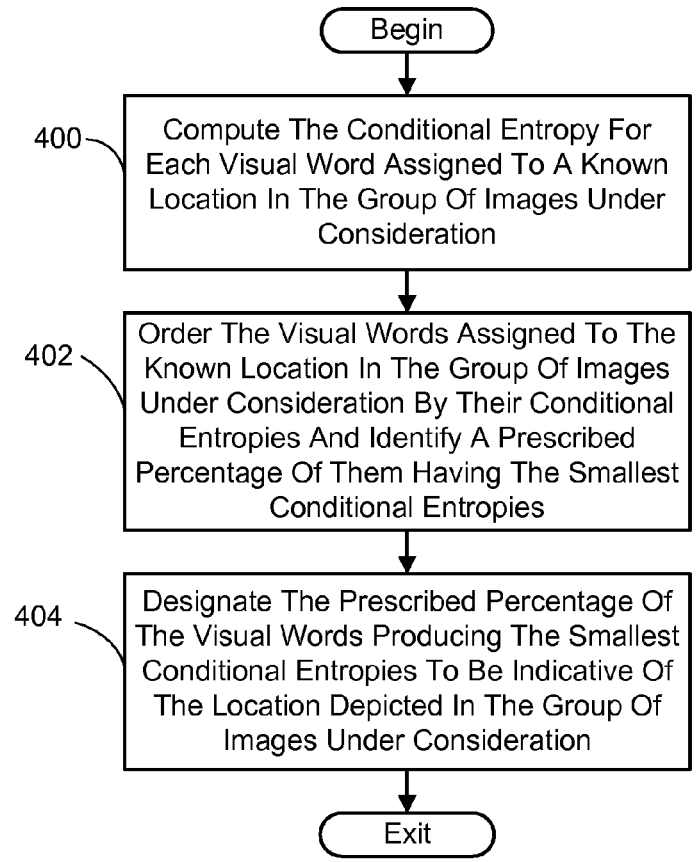
FIG. 4 depicts a flow diagram generally outlining one embodiment of a process for determining if a visual word output by a precursory vocabulary tree is indicative of a location depicted in a group of known location images.

Given this, referring to FIG. 4, in one embodiment of the present technique the aforementioned action of determining if a visual word is indicative of a location depicted in a group of images, generally involves first computing the conditional entropy for each visual word assigned to a known location image in the group of images (400). It is then determined which of the visual words assigned to a known location produce smaller conditional entropies (402). These visual words are then designated as being indicative of the location depicted in the group of images (404). It is noted that in tested embodiments of the present technique, the visual words assigned to a known location are ranked according to their conditional entropy and a prescribed percentage of the visual words associated with the smallest conditional entropies are designated as being indicative of the location depicted in the group of images. The prescribed percentage is chosen such that the total number of informative features designated across the entire database comes to about 8 million—i.e., the number of SIFT features that can be comfortably hierarchically clustered.

The conditional entropy $H(L_i|W_j)$ can be calculated as a function of just four terms: $N_{DB}$, $N_L$, $N_{w_j L_i}$, and $N_{w_j \overline{L}_i}$. The first two terms, $N_{DB}$ and $N_L$, are defined above and are constant for a given database. The last two terms vary with each location and visual word: $N_{w_j L_i}$ is the number of times visual word $w_j$ occurs at location $l_i$, and $N_{w_j \overline{L}_i}$ is the number of times visual word $w_j$ occurs at other database locations. For clarity, the variables a and b are substituted for $N_{w_j L_i}$ and $N_{w_j \overline{L}_i}$ in the equations that follow. Substituting Eq. (4) into Eq. (2) above, gives the conditional entropy, $$H(L_i|W_j) = \frac{a+b}{N_{DB}}\left[\frac{a}{a+b}\log\left(\frac{a}{a+b}\right) + \frac{b}{a+b}\log\left(\frac{b}{a+b}\right)\right] - \frac{N_{DB}-a-b}{N_{DB}}\left[\frac{N_L-a}{N_{DB}-a-b}\log\left(\frac{N_L-a}{N_{DB}-a-b}\right) + \frac{N_{DB}-N_L-b}{N_{DB}-a-b}\log\left(\frac{N_{DB}-N_L-b}{N_{DB}-a-b}\right)\right] \quad (6)$$

The significance of this equation is that the information gain of a visual word is captured by a simple function of the values a and b.

Note that for a given location, it is only necessary to compute this conditional entropy for visual words which actually occur in the images at that location. In theory, it is possible that there may be some visual word which occurs at every location except one, in which case the absence of this visual word would be very informative about that location. However, in practice it is assumed no such features exist, which is supported by the observation that each visual word generally occurs in some small fraction of the images. Thus, for visual words not present at some location the conditional entropy $H(L_i|W_j) \approx H(L_i)$ and the information gain $I(L_i|W_j) \approx H(L_i) - H(L_i) \approx 0$, meaning that for any location there is negligible information gain associated with visual words which do not appear there.

2.3 Greedy N-Best Paths Search

A popular search heuristic for approximate nearest neighbors in kd-trees is the Best Bin First (BBF) method. Bounds are computed on the nearest possible feature residing in each path not followed as the search descends down the tree, and a specified number of candidate features are considered in succession. The present technique can employ this type of search. However, a new search technique can be used instead. This new technique, dubbed the Greedy N-Best Paths (GNP) search technique, exploits the unique properties of metric trees to allow a user to specify how much computation takes place during a nearest neighbor search. The GNP search technique generally follows multiple branches at each level rather than just the branch whose parent is closest to the query feature. One embodiment of a pseudo code implementation of this improved technique is:

```
Given query feature q, and level d = 1
Compute distance from q to all k children of root node
While (d < D){
    d = d + 1
    Candidates=children of closest N nodes at level d − 1
    Compute distance from q to all kN candidates
}
Return all features quantized under N closest candidates
```

Figure 5:
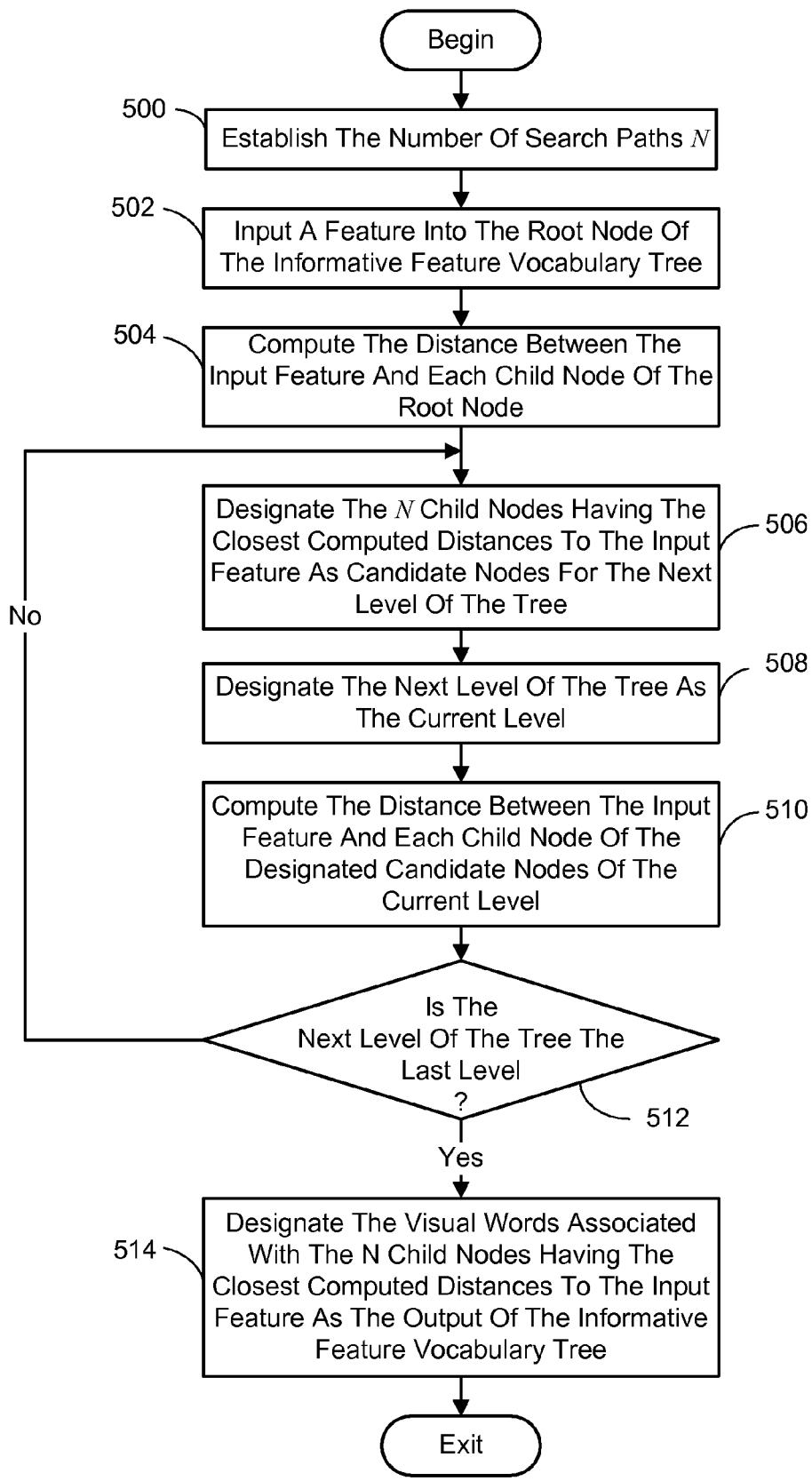
FIG. 5 depicts a flow diagram generally outlining one embodiment of a process for searching a metric tree, including a vocabulary-type metric tree, using a novel Greedy N-Best Paths (GNP) search technique in accordance with the present invention.

One way of implementing the foregoing GNP search technique for each query image feature input into the informative feature vocabulary tree, is generally outlined in the flow diagram of FIG. 5. It is noted that the query features are generically referred to as features in the flow diagram. The technique begins by establishing the number of search paths N desired (500), which is some number greater than 1. The factors playing into the choice of N will be described shortly. The feature is input into the root node of the informative feature vocabulary tree (502), and the distance between the feature and each child node of the root node is computed (504). The N child nodes having the closest computed distances to the input feature are then designated as candidate nodes for the next level of the informative feature vocabulary tree (506). In addition, the next level of the informative feature vocabulary tree is designated as the current level (508). Next, the distance between the feature and each child node of the designated candidate nodes of the current level are computed (510). It is then determined if the next level of the informative feature vocabulary tree in relation to the current level is the last level of the tree (512). If it is not, actions 506 through 512 are then repeated. If it is the last level of the tree, then the visual words associated with the N child nodes having the closest computed distances to the input feature are designated as the output of the informative feature vocabulary tree (514).

It should be noted that the output of the informative feature vocabulary tree when the present GNP search technique is employed will be more than one visual word for each feature input into the tree. This has a minor procedural impact on the location recognition technique described previously. Generally, it simply means that N visual words are associated with a query image each time a query image feature is input into the informative feature vocabulary tree. While the additional visual words will add an amount of noise to the technique and increase the processing costs somewhat, the benefit is that the probability of associating the correct visual word to a query image increases significantly, as will be discussed below.

A modified version of the foregoing GNP technique can be used to identify the visual word that is assigned to each database feature associated with the known location images of the database. The procedure is the same until it is determined that the next level of the tree is the last level. Instead of designating the visual words associated with the N child nodes having the closest computed distances to the input feature as the output of the tree, only the visual word associated with the single child node having the closest computed distance to the input feature is designated as the output.

2.3.1 Branching Factor vs. GNP

For a fixed vocabulary size M, corresponding to the number of leaf nodes in a tree, there are several ways to construct a vocabulary tree. This is accomplished by varying the branching factor k and depth D of the tree such that $k^D \approx M$ for integer values of k and D. It is known that increasing the branching factor k for a fixed vocabulary size tends to improve performance by minimizing the number of queries that result in an output from the tree that does not represent the closest last level node to a query. The reason for this improvement in performance may not be due to the fact that increasing branching factor produces better-structured trees, but to the fact that more nodes are being considered in traversing a tree with higher branching factor. The present GNP search technique offers a way to consider many more nodes in a vocabulary tree (or more generally in a metric tree) by increasing the number of paths followed N, rather than increasing the branching factor. For example, for branching factor k and depth D, the normal search algorithm for a metric tree performs k comparisons between the query feature and the nodes of the tree at each of D levels for a total of kD comparisons. The present GNP search technique performs k comparisons at the top level, and kN comparisons at each of the remaining D−1 levels, for a total of k+kN(D−1) comparisons. This allows the user to specify the amount of computation per search by varying the number of paths followed N, for N>1.

It has been found that comparable performance can be achieved between a vocabulary tree with a higher branching factor that results in a particular number of nodes being considered using a standard search, and a vocabulary tree having a lower branching factor using the GNP search technique with N set to a number that causes approximately the same number of nodes to be considered. This is significant because changing the branching factor of a vocabulary tree requires time-consuming offline retraining via hierarchical k-means. However, varying the number of nodes searched is a decision that can be made at search time based on available computational power. Thus, it is possible to concentrate not on the relationship between performance and branching factor, but between performance and number of comparisons per query feature—a measure which the GNP search techniques can be used to optimize.

2.4 Voting Scheme

Figure 6:
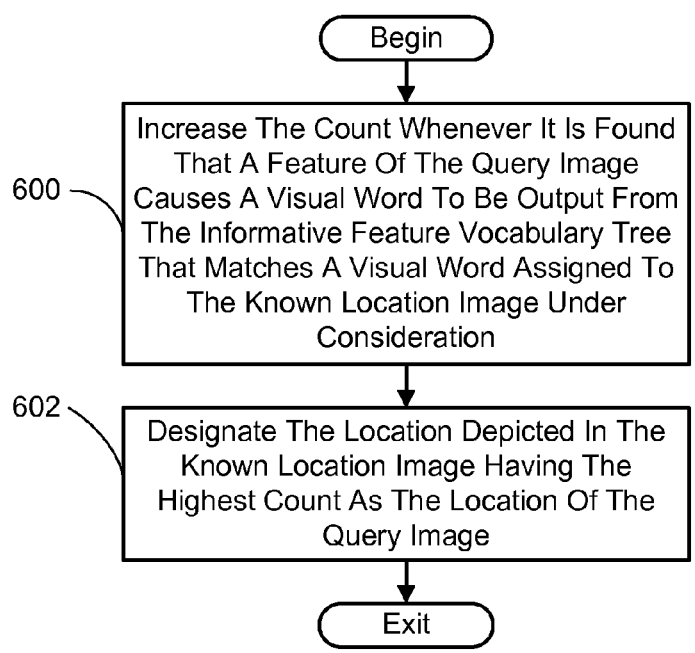
FIG. 6 depicts a flow diagram generally outlining one embodiment of a process for finding the best-matching known location image for a given query image, using a voting scheme.

To find the best-matching known location image for a given query image, each feature in the query image is matched to a number of features in the database using a vocabulary tree. A voting scheme is used in which matched features from the database vote for the images from which they originate. In one embodiment of the present technique shown in FIG. 6, this is generally accomplished by, for each known location image, increasing a count whenever it is found that a feature of the query image causes a visual word to be output from the informative feature vocabulary tree that matches a visual word assigned to the known location image (600). The location depicted in the known location image having the highest count is then designated as the location of the query image (602).

To achieve better performance, the vote tallies can be normalized by $N_{fi}$ (the number of features in a given database image i) and $NN_k$ (the number of near neighbors returned for a given query feature $f_k$). In addition, the tallies are averaged over a local neighborhood of $N_{loc}$ images. Thus, the number of votes for an image i can be computed by looping over every feature in each image in a local neighborhood, and comparing it against each feature in the query image, producing the following triple-summation:

$$count_i = \frac{1}{N_{loc}} \sum_{i=g-\frac{N_{loc}}{2}}^{g+\frac{N_{loc}}{2}} \frac{1}{N_{fi}} \sum_{j=1}^{N_{fi}} \sum_{k=1}^{N_{fq}} \delta_{match}(f_j, f_k) \frac{1}{NN_k} \quad (7)$$

where g refers to the image under consideration, $N_{fq}$ is the number of query features $f_k$ in the query image, $\delta_{match}(f_j,f_k)=1$ when database feature $f_j$ and query feature $f_k$ are both quantized to the same visual word in the vocabulary tree, and $\delta_{match}(f_j,f_k)=0$ otherwise. The number of near neighbors returned for each query can be computed as:

$$NN_k = \sum_{i=0}^{N_{DB}} \sum_{j=1}^{N_{fi}} \delta_{match}(f_j, f_k) \quad (8)$$

Figure 7A:
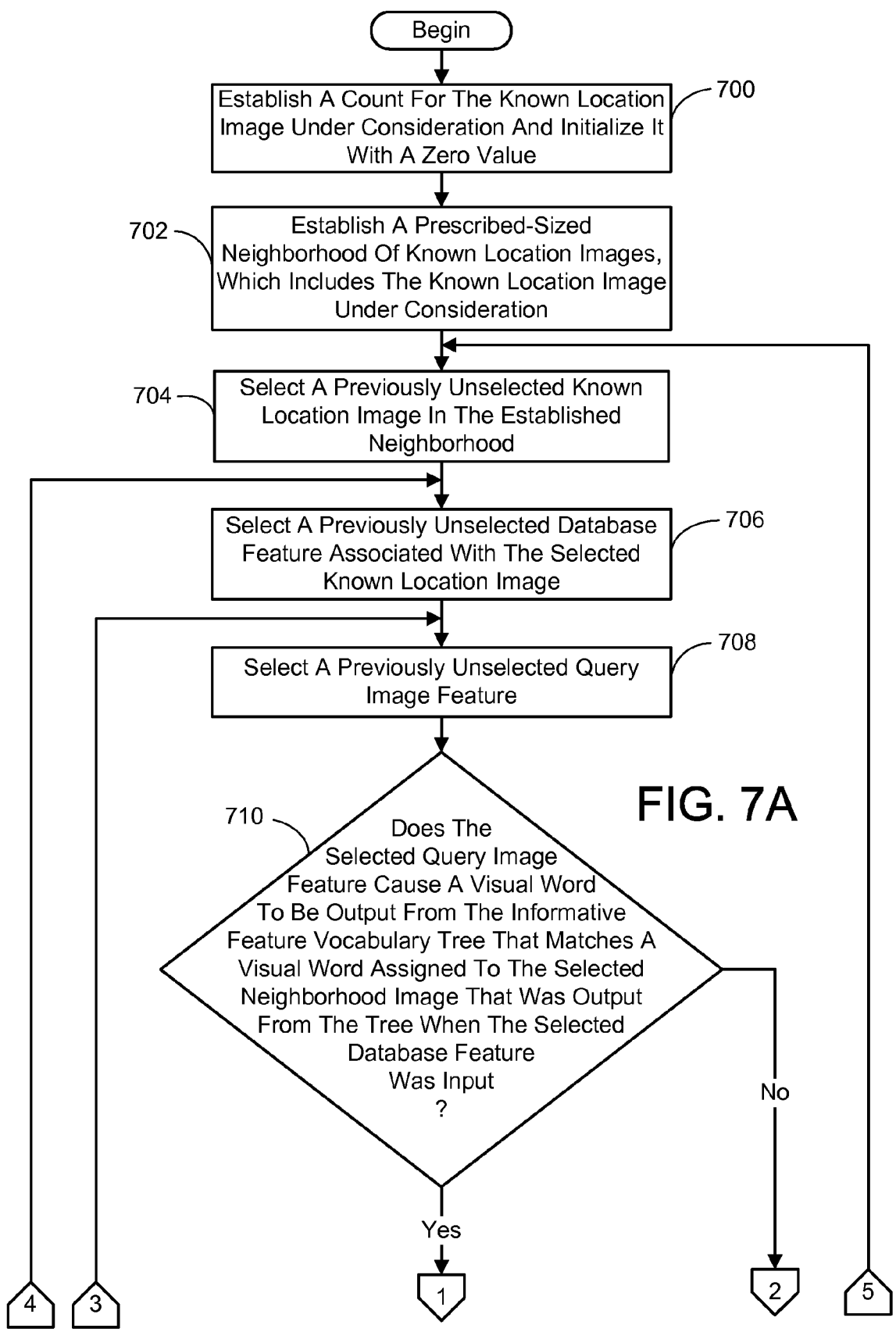
FIGS. 7A-B depict a continuing flow diagram generally outlining one embodiment of a process for implementing the voting scheme of FIG. 6, using a normalized count technique.
Figure 7B:
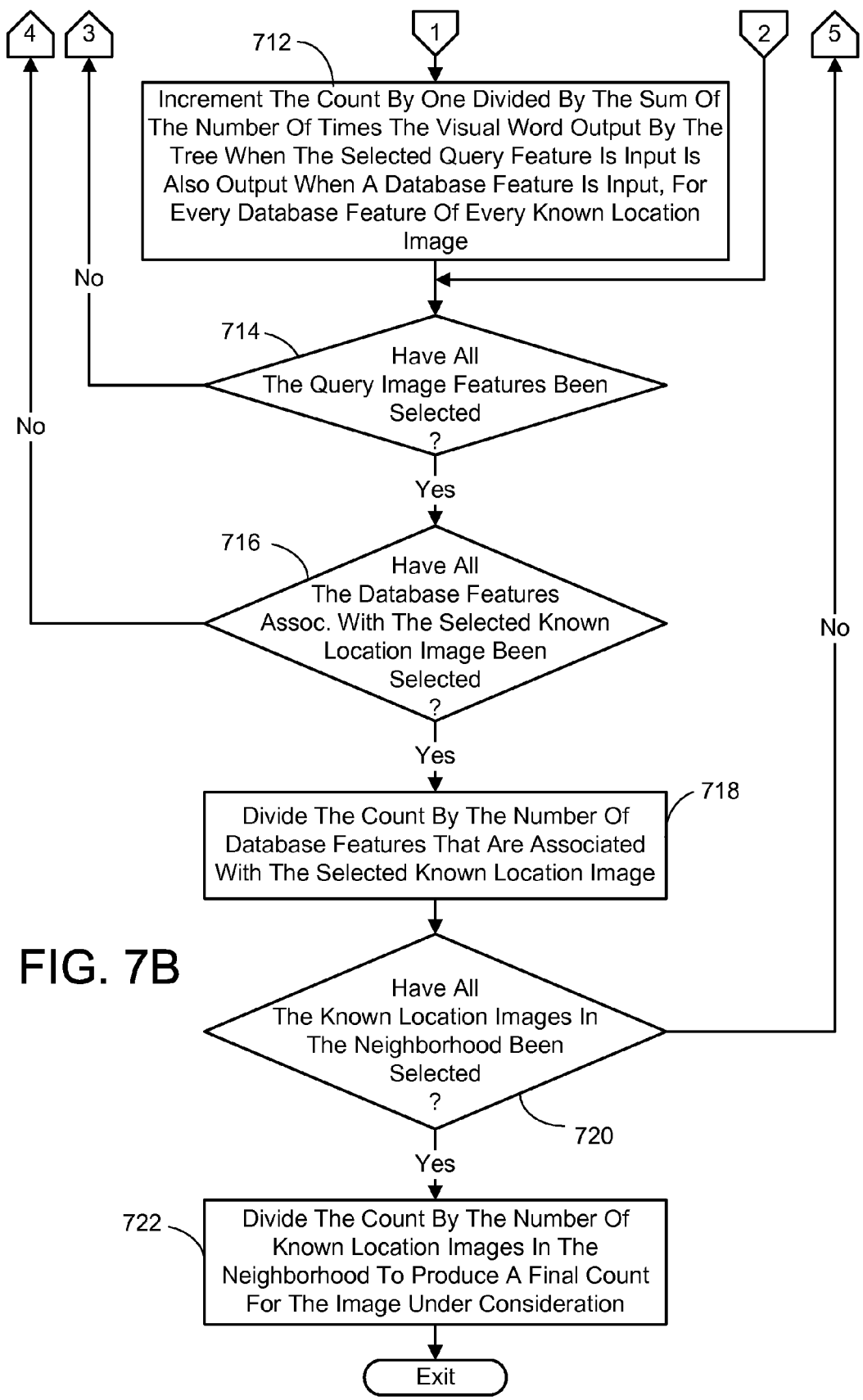

One way of implementing the foregoing normalized count technique for each known location image is outlined in FIGS. 7A-B. A count is first established for the known location image and initializing with a value of zero (700). Next, a prescribed-sized neighborhood of known location images is established, which includes the known location image (702). A previously unselected known location image in the neighborhood is then selected (704), followed by the selection of a previously unselected database feature associated with the selected known location image (706), and then the selection of a previously unselected query image feature (708). It is next determined if the selected query image feature causes a visual word to be output from the informative feature vocabulary tree that matches a visual word assigned to the selected neighborhood known location image that was output from the tree when the selected database feature was input at the time the tree was generated (710). If so, the count is incremented by one, divided by the sum of the number of times the visual word output by the tree when the selected query feature is input is also output when a database feature is input, for every database feature of every known location image (712). If not, the count is not changed. It is then determined if all the query image features have been selected and processed (714). If not, actions 708 through 714 are repeated. When all the query image features have been considered, it is determined if all the database features associated with the selected known location image have been selected (716). If not, then actions 706 through 716 are repeated. If all the database features have been selected, the current count is divided by the number of database features that are associated with the selected known location image (718). It is then determined if all the known location images in the neighborhood have been selected (720). If not, actions 704 through 720 are repeated. When all the neighborhood images have been considered, the resulting count is divided by the number of known location images in the neighborhood to produce a final count for the image under consideration (722).

3.0 Other Embodiments

In the foregoing description of embodiments for the present GNP search technique, it was indicated that the technique can be used to improve the performance of vocabulary tree searches. However, it should be noted that the GNP search technique can improve the performance of the search of any metric tree in general. Thus, the use of this technique should not be deemed to be limited to only vocabulary-type metric trees, but instead to be applicable to any metric tree.

It should also be noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for location recognition using a query image depicting a location it is desired to identify and a database of features associated with images of known locations, comprising using a computer to perform the following process actions:

generating query image features representative of the query image using the same technique as used to generate the database features resident in the database from the known location images;

for each feature associated with the query image, inputting the query image feature into an informative feature vocabulary tree and identifying a visual word output by the vocabulary tree for that query image feature, wherein the informative feature vocabulary tree was generated using just those database features that have been deemed informative of the known locations and was used to assign visual words to each known location image that are output from the tree whenever a database feature associated with that image is input into the tree, and wherein said database features that have been deemed informative of the known locations are, for each known location, more indicative of that location than other known locations;

identifying the known location image having the most visual words in common with the query image; and designating the location associated with the identified known location image as the location depicted in the query image.

2. The process of claim 1, further comprising the actions of:
prior to generating the query image features,
generating an informative feature vocabulary tree using just those database features that have been deemed informative of the known locations,
for each database feature associated with each known location image, inputting the database feature into the informative feature vocabulary tree and identifying a visual word output by the tree for that database feature, and
for each known location image, assigning the visual words identified from the database features associated with that image to that image.

3. The process of claim 2, wherein the known location images comprise for each location a group of images depicting that location captured from different viewpoints, and wherein the process action of generating the informative feature vocabulary tree using just those database features that have been deemed informative of the known locations, comprises the actions of:
generating a precursory vocabulary tree using a group of database features that are not necessarily most indicative of the known locations;
inputting all the database features into the precursory vocabulary tree and identifying a visual word output for each database feature;
assigning each identified visual word output from the precursory vocabulary tree to the known location image from which the database feature producing the visual word was derived;
identifying how many times each visual word output from the precursory vocabulary tree was assigned to each group of known location images depicting a same location;
determining for each group of known location images depicting the same location and each visual word assigned to a known location image in that group if the visual word is indicative of the location depicted in the group of images based on the number of times the visual word was assigned to an image in the group in view of the number of times the visual word was assigned to an image not in the group;
designating the database feature associated with each visual word determined to be indicative of the location depicted in a group of images depicting the same location to be informative of that location; and
using only those database features designated as being informative of a location to generating the informative feature vocabulary tree.

4. The process of claim 3, wherein the group of database features that are not necessarily most indicative of the known locations represent all the features in the database.

5. The process of claim 3, wherein the database of features associated with images of known locations is too large to effectively generate a single precursory vocabulary tree, and wherein the group of database features represents database features associated with a prescribed-sized portion of the known location images, and wherein the process action of generating the precursory vocabulary tree and the subsequent actions of inputting, assigning, identifying, determining and designating, are repeated for multiple groups of the database features each representing a different portion of the known location images until all the known location images have been processed, and then the database features designated as being informative of a location from all the precursory vocabulary trees are used to generate the informative feature vocabulary tree.

6. The process of claim 3, wherein the process actions of generating a precursory vocabulary tree using a group of database features that are not necessarily most indicative of the known locations and generating the informative feature vocabulary tree, comprise an action of employing a hierarchical k-means technique wherein the cluster centers are initialized so as to be as far apart from each other as possible.

7. The process of claim 3, wherein the process action of determining if a visual word is indicative of a location depicted in a group of images, comprises the actions of:
respectively computing the conditional entropy for each visual word assigned to a known location in the group of images under consideration;
ordering the visual words assigned to the known location in the group of images under consideration by their conditional entropies and identifying a prescribed percentage of them having the smallest conditional entropies; and
designating the prescribed percentage of the visual words producing the smallest conditional entropies to be indicative of the location depicted in the group of images under consideration.

8. The process of claim 7, wherein the process action of computing the conditional entropy of a visual word assigned to a known location image in a group of known location images, comprises an action of computing the equation, $$\frac{a+b}{N_{DB}}\left[\frac{a}{a+b}\log\left(\frac{a}{a+b}\right) + \frac{b}{a+b}\log\left(\frac{b}{a+b}\right)\right] -$$
$$\frac{N_{DB}-a-b}{N_{DB}}\left[\frac{N_L-a}{N_{DB}-a-b}\log\left(\frac{N_L-a}{N_{DB}-a-b}\right) + \right.$$
$$\left.\frac{N_{DB}-N_L-b}{N_{DB}-a-b}\log\left(\frac{N_{DB}-N_L-b}{N_{DB}-a-b}\right)\right]$$

where $N_{DB}$ is the number of known location images used to produce the features in the database, $N_L$ is the number of known location images in the group of images, a is the number of times the visual word was assigned to a known location image in the group of known location images, and b is the number of times the visual word was assigned to a known location image not in the group of known location images.

9. The process of claim 1, wherein the process action of identifying the known location image having the most visual words in common with the query image, comprises the actions of:
employing a voting scheme wherein, for each feature of the query image which causes a visual word to be output from the informative feature vocabulary tree that matches a visual word assigned to a known location image, a count associated with that known location image is increased;
designating the known location image having the highest count as the known location image having the most visual words in common with the query image.

10. The process of claim 1, wherein the process action of identifying the known location image having the most visual words in common with the query image, comprises the actions of:

for each known location image i, computing the equation, $$count_i = \frac{1}{N_{loc}} \sum_{i=g-\frac{N_{loc}}{2}}^{g+\frac{N_{loc}}{2}} \frac{1}{N_{fi}} \sum_{j=1}^{N_{fi}} \sum_{k=1}^{N_{fq}} \delta_{match}(f_j, f_k) \frac{1}{NN_k},$$

where count$_i$ is a count associated with the i$^{th}$ known location image, $N_{loc}$ is number of known location images in the prescribed-sized neighborhood of known location images including the known location image under consideration, g is a number assigned to each known location image wherein the known location images are numbered sequentially and groups of images depicting the same location exhibit consecutive sequential numbers, $N_{fi}$ is the number of features derived from a given database image i, $N_{fq}$ is the number of features in a query image, $\delta_{match}(f_j, f_k) = 1$ when database feature $f_j$ and query feature $f_k$ both cause the same visual word to be output from the informative feature vocabulary tree, $\delta_{match}(f_j, f_k) = 0$ otherwise, and $$NN_k = \sum_{i=0}^{N_{DB}} \sum_{j=1}^{N_{fi}} \delta_{match}(f_j, f_k)$$

with $N_{DB}$ referring to the total number of known location images; and
designating the known location image having the highest count value as the known location image having the most visual words in common with the query image.

11. The process of claim 1, wherein the features are Scale Invariant Feature Transform (SIFT) feature descriptors.

12. A system for location recognition using a query image depicting a location it is desired to identify and a database of features associated with images of known locations, comprising:
a general purpose computing device;
a computer program comprising program modules executable by the computing device, wherein the computing device is directed by the program modules of the computer program to,
generate query image features representative of the query image using the same technique as used to generate the database features resident in the database from the known location images;
for each feature associated with the query image, input the query image feature into an informative feature vocabulary tree and identify two or more visual words output by the vocabulary tree for that query image feature, wherein the informative feature vocabulary tree was generated using just those database features that have been deemed informative of the known locations and was used to assign visual words to each known location image that are output from the tree whenever a database feature associated with that image is input into the tree, and wherein said database features that have been deemed informative of the known locations are, for each known location, more indicative of that location than other known locations;
identify the known location image having the most visual words in common with the query image; and
designate the location associated with the identified known location image as the location depicted in the query image.

13. The system of claim 12, wherein the program module for inputting a query image feature into the informative feature vocabulary tree and identifying two or more visual words output by the tree for that query image feature, comprises sub-modules for:
(a) establishing a number of search paths N, wherein N is greater than 1;
(b) inputting the query feature into the root node of the informative feature vocabulary tree;
(c) computing the distance between the query feature and each child node of the root node;
(d) designating N child nodes having the closest computed distances to the query feature as candidate nodes for the next level of the informative feature vocabulary tree;
(e) designating the next level of the informative feature vocabulary tree to be the current level;
(f) computing the distance between the query feature and each child node of just the candidate nodes of the current level;
(g) repeating sub-modules (d) through (f) until the next level of the informative feature vocabulary tree in relation to the current level is the last level of the tree; and
(h) designating the visual words associated with the N child nodes having the closest computed distances to the query feature as the output of the informative feature vocabulary tree.

14. The system of claim 12, further comprising program modules for:
prior to generating the query image features,
generating an informative feature vocabulary tree using just those database features that have been deemed informative of the known locations,
for each database feature associated with each known location image, inputting the database feature into the informative feature vocabulary tree and identifying a single visual word output by the tree for that database feature, and
for each known location image, assigning the visual words identified from the database features associated with that image to that image.

15. The system of claim 14, wherein the program module for inputting the database feature into the informative feature vocabulary tree and identifying the single visual word output by the tree for that database feature, comprises sub-modules for:
(a) establishing a number of search paths N, wherein N is greater than 1;
(b) inputting the database feature into the root node of the informative feature vocabulary tree;
(c) computing the distance between the database feature and each child node of the root node;
(d) designating N child nodes having the closest computed distances to the database feature as candidate nodes for the next level of the informative feature vocabulary tree;
(e) designating the next level of the informative feature vocabulary tree to be the current level;
(f) computing the distance between the database feature and each child node of just the candidate nodes of the current level;
(g) repeating sub-modules (d) through (f) until the next level of the informative feature vocabulary tree in relation to the current level is the last level of the tree; and
(h) designating the visual word associated with the child node having the closest computed distance to the database feature as the output of the informative feature vocabulary tree.

16. The system of claim 12, wherein the program module for identifying the known location image having the most visual words in common with the query image, comprises sub-modules for:
  employing a voting scheme wherein, for each feature of the query image which causes a visual word to be output from the informative feature vocabulary tree that matches a visual word assigned to a known location image, a count associated with that known location image is increased;
  designating the known location image having the highest count as the known location image having the most visual words in common with the query image.

17. The system of claim 16, wherein the sub-module for employing a voting scheme, comprises, for each known location image, sub-modules for:
  (a) establishing a count and initializing it with a value of zero;
  (b) establishing a prescribed-sized neighborhood of known location images including the known location image under consideration;
  (c) selecting a previously unselected known location image in the prescribed-sized neighborhood;
  (d) selecting a previously unselected database feature associated with the selected known location image;
  (e) selecting a previously unselected query image feature;
  (f) determining if the selected query image feature causes a visual word to be output from the informative feature vocabulary tree which matches a visual word assigned to the selected known location image that was output from the informative feature vocabulary tree when the selected database feature was input;
  (g) whenever the selected query image feature causes a visual word to be output from the informative feature vocabulary tree which matches a visual word assigned to the selected known location image that was output from the informative feature vocabulary tree when the selected database feature was input, incrementing the count by one divided by the sum of the number of times the visual word output by the informative feature vocabulary tree when the selected query feature is input is also output when a database feature is input, for every database feature of every known location image;
  (h) repeating actions (e) through (g) until all the query image features have been selected;
  (i) repeating actions (d) through (h) until all the database features associated with the selected known location image have been selected;
  (j) dividing the count by the number of database features that are associated with the selected known location image;
  (k) repeating actions (c) through (j) until all the known location images in the prescribed-sized neighborhood have been selected; and
  (l) dividing the count by the number of known location images in the prescribed-sized neighborhood.

\* \* \* \* \*

UNITED STATES PATENT AND TRADEMARK OFFICE
CERTIFICATE OF CORRECTION

| | | |
|---|---|---|
| PATENT NO. | : 7,945,576 B2 | Page 1 of 1 |
| APPLICATION NO. | : 11/754671 | |
| DATED | : May 17, 2011 | |
| INVENTOR(S) | : Matthew Brown et al. | |

It is certified that error appears in the above-identified patent and that said Letters Patent is hereby corrected as shown below:

In column 15, line 10, in Claim 10, delete "count," and insert -- $count_i$ --, therefor.

Signed and Sealed this
Twelfth Day of July, 2011

David J. Kappos
*Director of the United States Patent and Trademark Office*